(12) United States Patent
Kim et al.

(10) Patent No.: US 12,722,471 B2
(45) Date of Patent: Sep. 1, 2026

(54) HYDRAULIC MOUNT

(71) Applicants: Hyundai Motor Company, Seoul (KR); Kia Corporation, Seoul (KR); DAEHEUNG R&T CO., LTD., Gimhae-si (KR)

(72) Inventors: Jang Ho Kim, Yongin-Si (KR); Hyun Seok Choi, Yongin-Si (KR); Kang Wook Jeon, Suwon-si (KR); Yu Ho Kim, Busan (KR)

(73) Assignees: Hyundai Motor Company, Seoul (KR); Kia Corporation, Seoul (KR); DAEHEUNG R&T CO., LTD., Gimhae-si (KR)

( * ) Notice: Subject to any disclaimer, the term of this patent is extended or adjusted under 35 U.S.C. 154(b) by 429 days.

(21) Appl. No.: 18/214,337

(22) Filed: Jun. 26, 2023

(65) Prior Publication Data

US 2024/0198779 A1 Jun. 20, 2024

(30) Foreign Application Priority Data

Dec. 15, 2022 (KR) ........................ 10-2022-0176231

(51) Int. Cl.
*B60K 5/12* (2006.01)
*F16F 13/10* (2006.01)

(52) U.S. Cl.
CPC .......... *B60K 5/1208* (2013.01); *F16F 13/107* (2013.01)

(58) Field of Classification Search
CPC ...... F16F 13/105; F16F 13/106; F16F 13/107; F16F 13/262; B60G 13/08; B60K 5/1208
See application file for complete search history.

(56) References Cited

U.S. PATENT DOCUMENTS

| | | | | |
|---|---|---|---|---|
| 9,719,576 | B2 * | 8/2017 | Nagasawa | B60K 5/1208 |
| 10,406,904 | B2 * | 9/2019 | Kim | F16F 13/262 |
| 10,436,281 | B2 * | 10/2019 | Kim | F16F 13/105 |
| 11,230,178 | B2 * | 1/2022 | Kim | B60K 5/1283 |
| 11,292,306 | B2 * | 4/2022 | Kim | B60K 5/1208 |
| 11,428,290 | B2 * | 8/2022 | Ueki | F16F 13/10 |
| 11,571,958 | B2 * | 2/2023 | Kim | F16F 13/1463 |
| 11,904,694 | B2 * | 2/2024 | Kwon | F16F 13/107 |
| 2008/0290573 | A1 * | 11/2008 | Katayama | F16F 13/106 267/292 |
| 2016/0053846 | A1 * | 2/2016 | Nagasawa | B60K 5/1208 267/140.13 |

(Continued)

FOREIGN PATENT DOCUMENTS

KR 2022-0025382 A 3/2022

*Primary Examiner* — Thomas W Irvin
(74) *Attorney, Agent, or Firm* — MORGAN, LEWIS & BOCKIUS LLP

(57) ABSTRACT

A hydraulic mount in which a fluid for supporting an engine of a vehicle is sealed, includes a core configured to receive vibration from outside, an insulator molded on the external side of the core, and a diaphragm spaced at a predetermined distance from the insulator, wherein a fluid is sealed between the insulator and the diaphragm, and an upper chamber and a lower chamber are provided between the insulator and the diaphragm by a nozzle assembly. The nozzle assembly includes an upper nozzle located adjacent to the upper chamber, a lower nozzle coupled to the upper nozzle and located adjacent to the lower chamber, and a membrane located between the upper nozzle and the lower nozzle.

18 Claims, 7 Drawing Sheets

(56) References Cited

U.S. PATENT DOCUMENTS

2019/0017567 A1* 1/2019 Kim ...................... F16F 13/105
2019/0061509 A1* 2/2019 Kim ...................... F16F 13/262
2019/0136938 A1* 5/2019 Kim .......................... F16F 9/34
2020/0182326 A1* 6/2020 Kim ..................... B60K 5/1291
2021/0061039 A1* 3/2021 Kim ....................... B60G 13/08
2021/0309091 A1* 10/2021 Kim .................... F16F 13/1463
2022/0126669 A1* 4/2022 Kwon ................... F16F 13/105

* cited by examiner 140
120
100
110
130
150

Dynamic Characteristics (kgf/mm)

70
60
50
40
30
20
10
0

0 100 200 300 400 500 600

Frequency (Hz)

f

B
C
A

HYDRAULIC MOUNT

CROSS-REFERENCE TO RELATED APPLICATION

The present application claims priority to Korean Patent Application No. 10-2022-0176231, filed on Dec. 15, 2022, the entire contents of which is incorporated herein for all purposes by this reference.

BACKGROUND OF THE PRESENT DISCLOSURE

Field of the Present Disclosure

The present disclosure relates to a hydraulic mount, and more particularly, to a hydraulic mount in which a fluid is sealed for supporting an engine of a vehicle.

Description of Related Art

An engine mount of a vehicle is a component configured to support the engine of the vehicle. The engine mount may prevent vibration generated from the engine from being transmitted to a vehicle body and reduce vibration and noise generated from the engine.

Among the types of engine mount, a hydraulic mount utilizes a fluid sealed therein and a rubber insulator to provide damping characteristics capable of controlling isolation of vibration and behavior of a powertrain apparatus of a vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hydraulic mount including a structure configured for improving insulation performance in a predetermined frequency band without significant design change.

The object of the present disclosure is not limited to the object mentioned above, and other objects not mentioned herein will be clearly understood by those of ordinary skill in the art to which an exemplary embodiment of the present disclosure pertains (hereinafter, "those skilled in the art") based on the description below.

Various aspects of the present disclosure are directed to providing a hydraulic mount including a core configured to receive vibration from outside, an insulator molded on the external side of the core, and a diaphragm provided at a distance from the insulator. A fluid is sealed between the insulator and the diaphragm, and an upper chamber and a lower chamber are provided between the insulator and the diaphragm by a nozzle assembly. The nozzle assembly may include an upper nozzle located adjacent to the upper chamber, a lower nozzle coupled to the upper nozzle and located adjacent to the lower chamber, and a membrane located between the upper nozzle and the lower nozzle.

Other aspects and exemplary embodiments of the present disclosure are discussed infra.

It is to be understood that the term "vehicle" or "vehicular" or other similar terms as used herein are inclusive of motor vehicles in general, such as passenger automobiles including sports utility vehicles (SUVs), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

BRIEF DESCRIPTION OF THE DRAWINGS

FIG. 9 explains the performance of a hydraulic mount according to various exemplary embodiments of the present disclosure.

Figure 1:
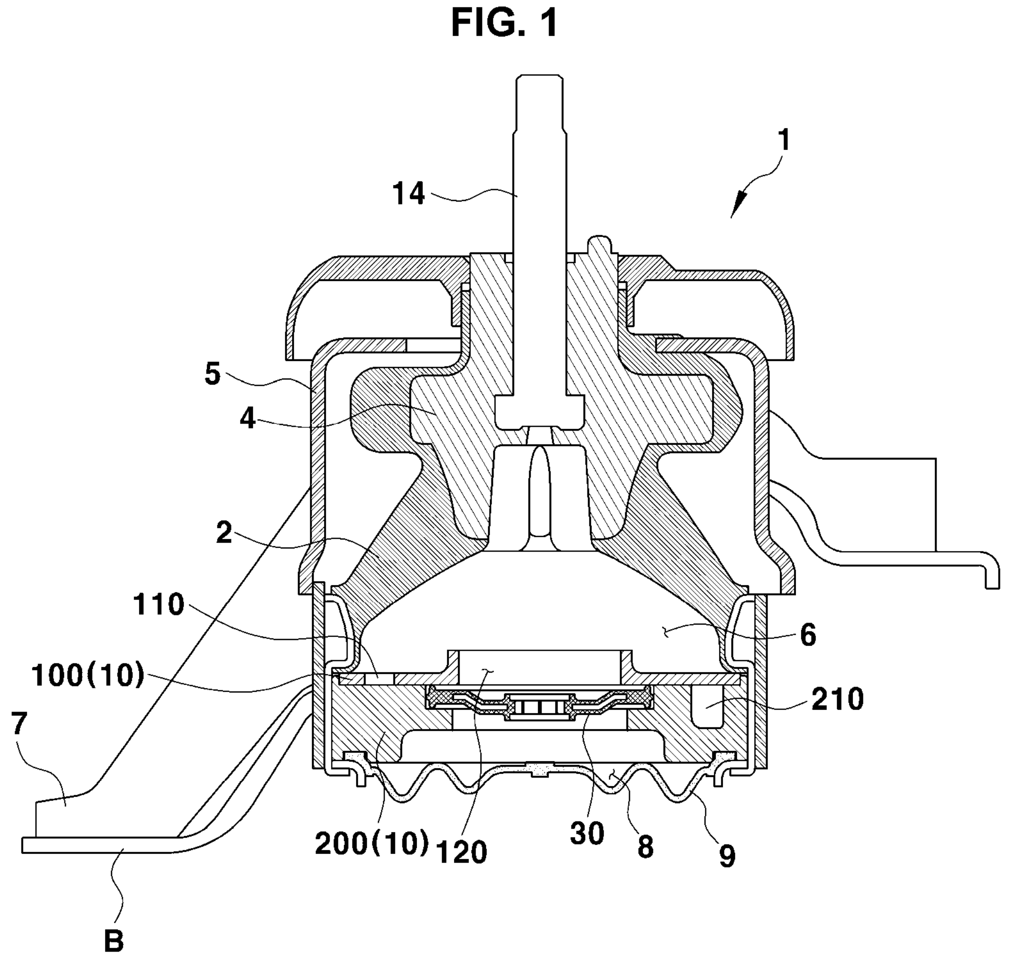
FIG. 1 illustrates a hydraulic mount according to various exemplary embodiments of the present disclosure.

It should be understood that the appended drawings are not necessarily to scale, presenting a somewhat simplified representation of various exemplary features illustrative of the basic principles of the present disclosure. The predetermined design features of the present disclosure as disclosed herein, including, for example, predetermined dimensions, orientations, locations, and shapes, will be determined in part by the particular intended application and usage environment.

In the figures, the reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Descriptions of specific structures or functions presented in the exemplary embodiments of the present disclosure are merely exemplary for explaining the embodiments according to the concept of the present disclosure, and the embodiments according to the concept of the present disclosure may be implemented in various forms. Furthermore, the descriptions should not be construed as being limited to the exemplary embodiments described herein, and should be understood to include all modifications, equivalents and substitutes falling within the idea and scope of the present disclosure.

Meanwhile, in an exemplary embodiment of the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of exemplary embodiments of the present disclosure.

It will be understood that, when a component is referred to as being "connected to" another component, the component may be directly connected to the other component, or intervening components may also be present. In contrast, when a component is referred to as being "directly connected to" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for illustrating embodiments and is not intended to limit the present disclosure. In the present specification, the singular form includes the plural sense, unless specified otherwise. The terms "comprises" and/or "comprising" used in the present specification mean that the cited component, step, operation, and/or element does not exclude the presence or addition of one or more of other components, steps, operations, and/or elements.

Hereinafter, the present disclosure will be described in detail with reference to the accompanying drawings.

According to an exemplary embodiment of the present disclosure, a hydraulic mount 1 may absorb engine vibration using an insulator 2 made of an elastic material, such as rubber, and a fluid sealed therein.

As illustrated in FIG. 1, the hydraulic mount 1 may be fastened to the engine of a vehicle using a core bolt 14 and a core 4. The insulator 2 is mounted on the external side of the core 4 and receives engine vibration through the core 4. The insulator 2 may be integrated with the core 4. For example, the insulator 2 made of rubber may be vulcanized on the core 4.

The hydraulic mount 1 includes the core bolt 14. The core bolt 14 is mounted on the internal side of the core 4, and the core bolt 14 includes a portion disposed to protrude outwards from a housing 5 of the hydraulic mount 1. In the housing 5, the insulator 2, the core 4, and the core bolt 14 are sequentially arranged from the outside thereof to the inside.

The hydraulic mount 1 may be coupled to the engine of the vehicle using the core bolt 14 and the core 4. The hydraulic mount 1 may be fixed to a vehicle body B of the vehicle using a bracket 7 mounted on the housing 5. The hydraulic mount 1 may be assembled to the bracket 7 using the core bolt 14, the core 4, and a nut, and the bracket 7 may be fastened to the engine. In various exemplary embodiments of the present disclosure, the hydraulic mount 1 may be assembled to the bracket 7 using a bolt and a tab on the core 4, instead of the core bolt 14. Accordingly, vibration of the engine is input to the hydraulic mount 1 through the core bolt 14 and the core 4. The insulator 2 receives the vibration through the core bolt 14 and the core 4 and moves to be elastically deformed, attenuating the vibration transmitted to the vehicle.

The hydraulic mount 1 is sealed with a fluid therein. A space is provided at a lower side of the housing 5. The space may include an upper chamber 6 and a lower chamber 8. The vibration of the engine may be absorbed by a fluid moving through a passage between the upper chamber 6 and the lower chamber 8. When the insulator 2 is deformed, the fluid may reduce the vibration of the engine while moving through the passage.

The upper chamber 6 may be divided from the lower chamber 8 by a nozzle assembly 10 and a membrane 30 disposed therebetween. As will be described below, the nozzle assembly 10 has first passages 110, 210, 220 and second passages 120, 230 formed therein so that the upper chamber 6 and the lower chamber 8 may fluidically-communicate with each other.

Figure 2A:
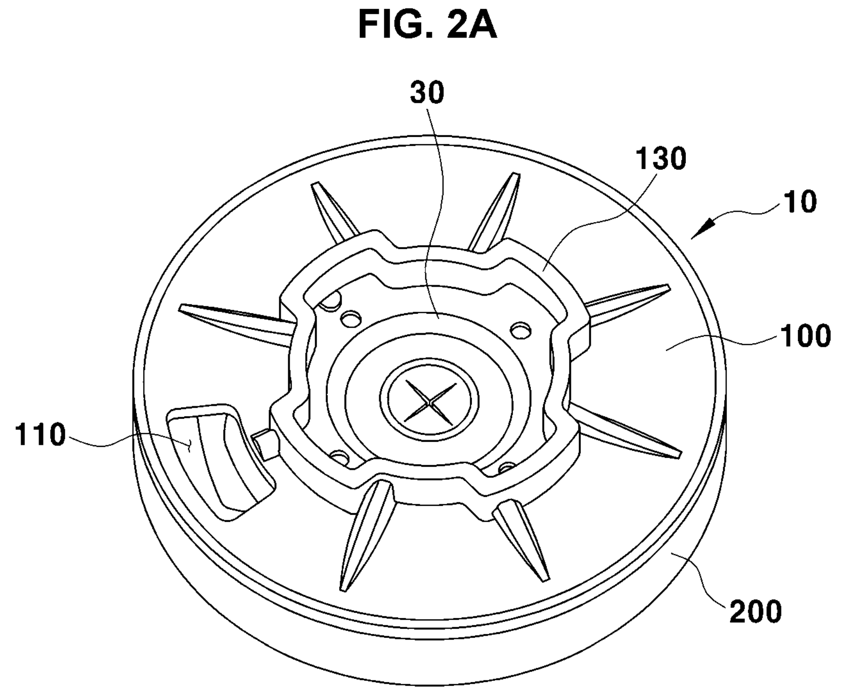
FIG. 2A illustrates a nozzle assembly of a hydraulic mount according to various exemplary embodiments of the present disclosure.
Figure 2B:
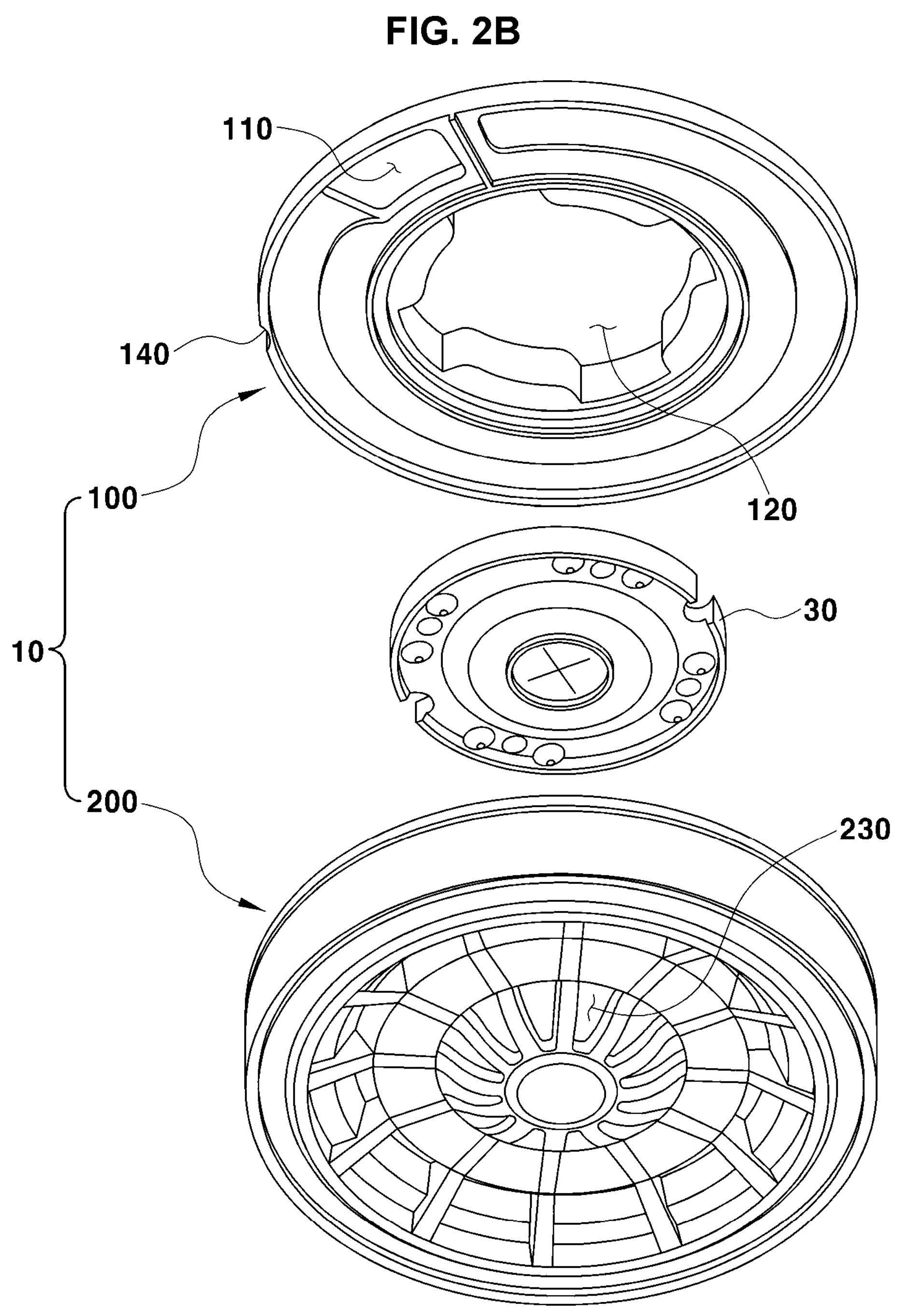
FIG. 2B is an exploded perspective view of the nozzle assembly of FIG. 2A.

As illustrated in FIG. 2A and FIG. 2B, the nozzle assembly 10 includes an upper nozzle 100 and a lower nozzle 200. The upper nozzle 100 and the lower nozzle 200 are coupled to each other to form the nozzle assembly 10.

Figures 3, 4:
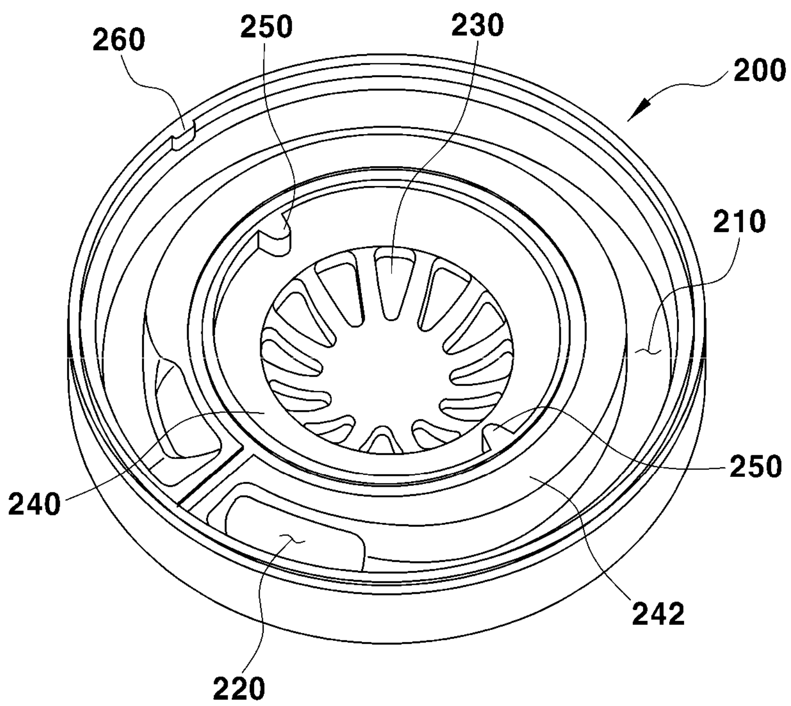
FIG. 3 is an upper nozzle of a nozzle assembly according to various exemplary embodiments of the present disclosure.
FIG. 4 is a lower nozzle of a nozzle assembly according to various exemplary embodiments of the present disclosure.

Referring to FIG. 3, the upper nozzle 100 includes two passages 110, 120. An upper nozzle first passage 110 may fluidically-communicate with the upper chamber 6 and the inside of the nozzle assembly 10 (ultimately, the lower chamber 8). The upper nozzle first passage 110 allows the fluid in the upper chamber 6 to flow to the nozzle assembly 10 or allows the fluid at the nozzle assembly 10 side to flow to the upper chamber 6. As a non-limiting example, the upper nozzle first passage 110 may be provided at a position adjacent to the circumferential portion of the upper nozzle 100.

An upper nozzle second passage 120 may fluidically-communicate with the upper chamber 6 and the inside of the nozzle assembly 10, together with the upper nozzle first passage 110. The upper nozzle second passage 120 may be directly brought into contact with the membrane 30 disposed inside the nozzle assembly 10 and may be formed in the center portion of the upper nozzle 100.

The hydraulic mount 1 according to an exemplary embodiment of the present disclosure may include the upper nozzle second passage 120 to change dynamic characteristics and damping at a predetermined excitation amplitude. The existence of the upper nozzle second passage 120 may not significantly affect the characteristics at a first excitation amplitude (e.g., ±0.2 mm or ±1.0 mm), but may significantly affect the characteristics at a second excitation amplitude (e.g., ±0.05 mm). When the upper nozzle second passage 120 is present, a damping peak value increases and a damping peak frequency decreases at the second excitation amplitude. Accordingly, a dynamic characteristic dip frequency also decreases, reducing the dynamic characteristics in a predetermined frequency band.

For the present reason, the hydraulic mount 1 according to an exemplary embodiment of the present disclosure may further include the upper nozzle second passage 120 in addition to the upper nozzle first passage 110, improving the dynamic characteristics at a predetermined excitation amplitude.

The upper nozzle 100 includes a guide wall 130. The guide wall 130 extends along the circumference of the upper nozzle second passage 120. The guide wall 130 protrudes from the surface of the upper nozzle 100 by a predetermined length and is disposed in the upper chamber 6. The guide wall 130 is disposed adjacent to the circumferential portion of the membrane 30 so that the fluid pressure in the upper chamber 6 may effectively act on the membrane 30 when vibration in a high frequency band is input. Furthermore, the guide wall 130 may prevent the pressure of the fluid acting on the upper side of the membrane 30 from being dispersed to surroundings.

The damping characteristics of the fluid damping in the hydraulic mount 1 vary depending on the length and cross-sectional area of the passage through which the fluid flows. Like the upper nozzle first passage 110 and a first passage movement portion 210, which are primary passages, the length and cross-sectional area of the upper nozzle second passage 120, which is a secondary passage, also play an important role. The height of the guide wall 130 may define the length of the passage, and the shape of the guide wall 130 may define the cross-sectional area of the passage. Compared to the upper nozzle first passage 110 and the first passage movement portion 210, there is less freedom in designing the length and cross-sectional area of the upper nozzle second passage 120. According to an exemplary embodiment of the present disclosure, the upper nozzle second passage 120 includes a non-circular shape, which helps to secure as large as possible the cross-sectional area of the upper nozzle second passage 120 including a structurally low degree of freedom in design, while not deteriorating other functions such as fixation of the membrane 30.

In other words, according to various exemplary embodiments of the present disclosure, the upper nozzle second passage 120 defined by the guide wall 130 may include a substantially cross shape rather than including a shape of a circle. To the present end, the upper nozzle second passage 120 may include a plurality of external diameter portions $D_o$ and a plurality of internal diameter portions $D_i$. Because the guide wall 130 is constructed by the external diameter portions $D_o$ and the internal diameter portions $D_i$ of the upper nozzle second passage 120 being connected to one another, the upper nozzle second passage 120 may generally include a cross shape. Such a shape of the guide wall 130 and the upper nozzle second passage 120 may work advantageously in fixing the membrane 30, maximizing the effect of the upper nozzle second passage 120. The same will be explained below.

In an exemplary embodiment of the present invention, the external diameter portions $D_o$ and the internal diameter portions $D_i$ are alternately formed along a circumferential direction of the upper nozzle second passage 120.

The upper nozzle 100 includes an upper nozzle first coupling portion 140. The upper nozzle first coupling portion 140 may interlock with an upper nozzle second coupling portion 260 formed in the lower nozzle 200 to fix the relative rotation between the upper nozzle 100 and the lower nozzle 200. The upper nozzle first coupling portion 140 may fix the rotation of the upper nozzle 100 with respect to the lower nozzle 200 and may be assembled to a required position thereof. In various exemplary embodiments of the present disclosure, the upper nozzle first coupling portion 140 may be recessed in a radial direction from the edge portion of the upper nozzle 100. The upper nozzle first coupling portion 140 may fix the relative rotation between the upper nozzle 100 and the lower nozzle 200 using the upper nozzle second coupling portion 260 formed in the lower nozzle 200. In various exemplary embodiments of the present disclosure, contrary to the drawing, the upper nozzle first coupling portion 140 may protrude radially outwards from the circumference of the upper nozzle 100. The protruding upper nozzle first coupling portion 140 may be inserted into the upper nozzle second coupling portion 260 in the lower nozzle 200 to fix the upper nozzle 100 and the lower nozzle 200 with respect to each other.

The upper nozzle 100 may include an upper surface provided with a plurality of radial members 150. The radial members 150 may extend at least partially in the radial direction of the upper nozzle 100 and protrude from the upper surface of the upper nozzle 100. The radial members 150 may prevent possible deformation of the nozzle assembly 10. As a non-limiting example, when the nozzle assembly 10 is made of a plastic material, deformation may occur due to heat shrinkage after injection because of the nature of the material. Furthermore, because the nozzle assembly 10 is disposed inside the hydraulic mount 1 and placed in an operating environment submerged in a fluid, the possibility of deformation during operation may not be ruled out. The radial members 150 may function as a reinforcing structure to minimize the possibility of such deformation.

Referring to FIG. 4, the lower nozzle 200 is coupled to the upper nozzle 100. The lower nozzle 200 is coupled to the upper nozzle 100 to form a passage at least partially inside the nozzle assembly 10. For example, the lower nozzle 200 includes a circumference having formed therein the first passage movement portion 210. The first passage movement portion 210 may fluidically-communicate with the upper nozzle first passage 110 in the upper nozzle 100. The first passage movement portion 210 is disposed to directly contact with the upper nozzle first passage 110. For example, the fluid introduced from the upper chamber 6 through the upper nozzle first passage 110 may flow through the first passage movement portion 210.

The lower nozzle 200 includes a lower nozzle first passage 220. The lower nozzle first passage 220 may be formed in the first passage movement portion 210. The lower nozzle first passage 220 may allow the fluid from the lower chamber 8 to be introduced into the first passage movement portion 210 or may discharge the fluid from the first passage movement portion 210 to the lower chamber 8.

When the hydraulic mount 1 is compressed, the fluid sealed therein moves from the upper nozzle first passage 110 toward the lower nozzle first passage 220 through the first passage movement portion 210. Conversely, when the hydraulic mount 1 is stretched, the fluid may move from the lower nozzle first passage 220 toward the upper nozzle first passage 110 through the first passage movement portion 210.

The lower nozzle 200 includes a partially blocked lower nozzle second passage 230. The lower nozzle second passage 230 may not be a completely open hole, and a member such as a lattice or a comb may be provided in the lower nozzle second passage 230. In the housing 5, a diaphragm 9 is mounted below the lower nozzle second passage 230 in the lower nozzle 200. In other words, a space between the upper chamber 6 and the lower chamber 8 may be defined by the insulator 2 and the diaphragm 9, and a fluid is sealed in the space.

A seating portion 240 is provided in a circumference of the lower nozzle second passage 230. The seating portion 240 may seat the membrane 30 thereon. The seating portion 240 includes a height greater than the first passage movement portion 210 and smaller than an extending portion 242.

According to various exemplary embodiments of the present disclosure, the seating portion 240 may include a membrane first coupling portion 250. The membrane first coupling portion 250 may prevent rotation of the membrane 30, when coupled to the membrane 30. In various exemplary embodiments of the present disclosure, the membrane first coupling portion 250 may upwardly protrude from the seating portion 240 and may protrude radially inwards from the extending portion 242. In various exemplary embodiments of the present disclosure, the membrane first coupling portion 250 may be recessed outwards in the radial direction of the lower nozzle 200 at the extending portion 242.

The lower nozzle 200 includes the upper nozzle second coupling portion 260. The upper nozzle second coupling portion 260 may be engaged with the upper nozzle first coupling portion 140 of the upper nozzle 100. The number of the upper nozzle second coupling portion 260 may be the same as the number of the upper nozzle first coupling portions 140. Although there is illustrated one upper nozzle second coupling portion 260 in the drawing, the number of the upper nozzle first coupling portion 140 and the number of the upper nozzle second coupling portion 260 may be increased or decreased. However, it may be sufficient to form only one upper nozzle first coupling portion 140 and one upper nozzle second coupling portion 260, respectively.

Figure 5:
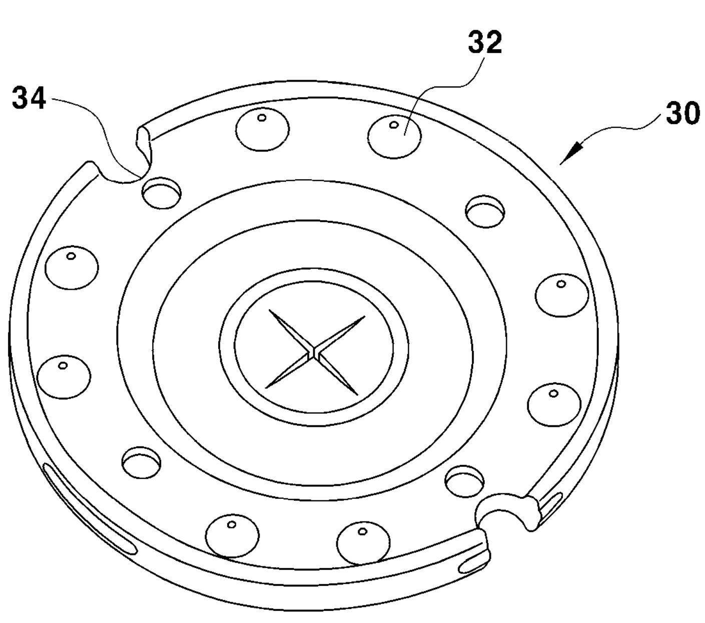
FIG. 5 is a membrane according to various exemplary embodiments of the present disclosure.
Figure 6:
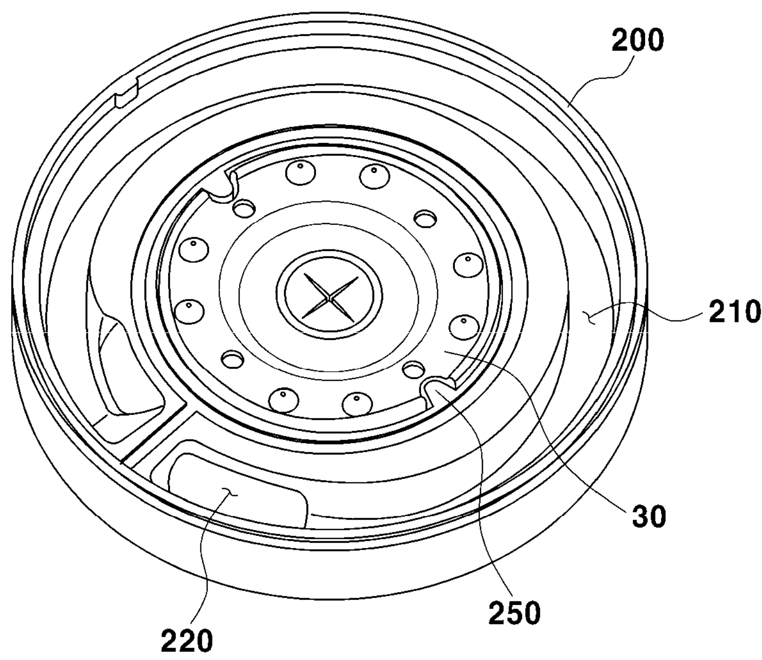
FIG. 6 illustrates a state in which a membrane is accommodated on a lower nozzle according to various exemplary embodiments of the present disclosure.

As illustrated in FIG. 5 and FIG. 6, the membrane 30 made of an elastic material is disposed between the upper nozzle 100 and the lower nozzle 200. The membrane 30 may be accommodated on the lower nozzle 200 and fixed in place by being located between the upper nozzle 100 and the lower nozzle 200. The membrane 30 vibrates by the flow of the fluid to damp the vibration introduced from the engine. For the present reason, the circumferential portion of the membrane 30 is sandwiched between the upper nozzle 100 and the lower nozzle 200.

The membrane 30 is disposed on the nozzle assembly 10 to fluidically-communicate with the upper chamber 6 through the upper nozzle second passage 120. Engine vibration in a low frequency range may be damped when a fluid flows through the upper nozzle first passage 110 by the elastic motion of the insulator 2, and engine vibration in a high frequency range may be damped by the membrane 30 that vibrates due to fluid viscosity and frictional force. Furthermore, a flow of a small amount of fluid may be induced by a gap between the upper nozzle 100 and the lower nozzle 200 or a gap formed in the membrane 30 itself, promoting vibration of the membrane 30.

The membrane 30 includes a plurality of fixing protrusions 32. The fixing protrusions 32 protrude from the surface of the membrane 30. The fixing protrusions 32 perform a function of fixing the membrane 30 to the upper nozzle 100 to keep dynamic characteristics as low as possible. According to various exemplary embodiments of the present disclosure, the fixing protrusions 32 may be spaced from one another at predetermined intervals in the circumferential direction of the membrane 30 and provided in a predetermined number.

According to various exemplary embodiments of the present disclosure, the membrane 30 includes a membrane second coupling portion 34. In various exemplary embodiments of the present disclosure, the membrane second coupling portion 34 is recessed radially inwards from the circumference of the membrane 30. In various exemplary embodiments of the present disclosure, the membrane second coupling portion 34 may protrude radially outwards from the circumference of the membrane 30. Although there are illustrated two membrane second coupling portions 34 in the drawing, the number thereof may be increased or decreased. However, when two or more membrane second coupling portions 34 are provided, the same may be symmetrical in the membrane 30.

The second membrane coupling portion 34 may include a shape associated with the membrane first coupling portion 250 to prevent movement or rotation between the lower nozzle 200 and the membrane 30. The membrane second coupling portion 34 may have inserted or received therein the first membrane coupling portion 250 of the seating portion 240. With the present structure, the membrane 30 may be fixed in place, and relative movement between the membrane 30 and the lower nozzle 200 may be avoided so that the position of the fixing protrusion 32 is kept constant.

According to various exemplary embodiments of the present disclosure, the distance between the membrane second coupling portion 34 and a fixing protrusion 32 adjacent thereto may be different from the distance between the membrane second coupling portion 34 and a fixing protrusion 32 not adjacent thereto.

The operation and effect of the hydraulic mount according to an exemplary embodiment of the present disclosure may be explained as follows.

When it is necessary to further lower the frequency band in which the dynamic characteristics are reduced, the dynamic characteristic dip frequency may be moved. It is confirmed that it is advantageous to change the diameter of the upper nozzle second passage 120 to move the dip frequency. There is no great difficulty in reducing the diameter of the upper nozzle second passage 120, but there are limitations in increasing the diameter of the upper nozzle second passage 120.

First, because the upper nozzle first passage 110 for damping with respect to a first excitation amplitude (e.g., ±1.0 mm) is formed at the circumferential portion of the upper nozzle 100, there is a limit to increasing the diameter of the upper nozzle second passage 120. Furthermore, the upper nozzle 100 is configured to fix the membrane 30, but the durability of the membrane 30 tends to deteriorate as a fixing portion P (see FIG. 7) fixing the membrane 30 in the upper nozzle 100 becomes smaller. Therefore, it is difficult to increase the diameter of the upper nozzle second passage 120 without changing the overall design of the hydraulic mount in consideration of performance.

For the present reason, various aspects of the present disclosure are directed to providing a hydraulic mount including a structure configured for moving the dynamic characteristic dip frequency to a target value without adversely affecting the durability of the membrane or changing the entire hydraulic mount.

Figures 7, 8:
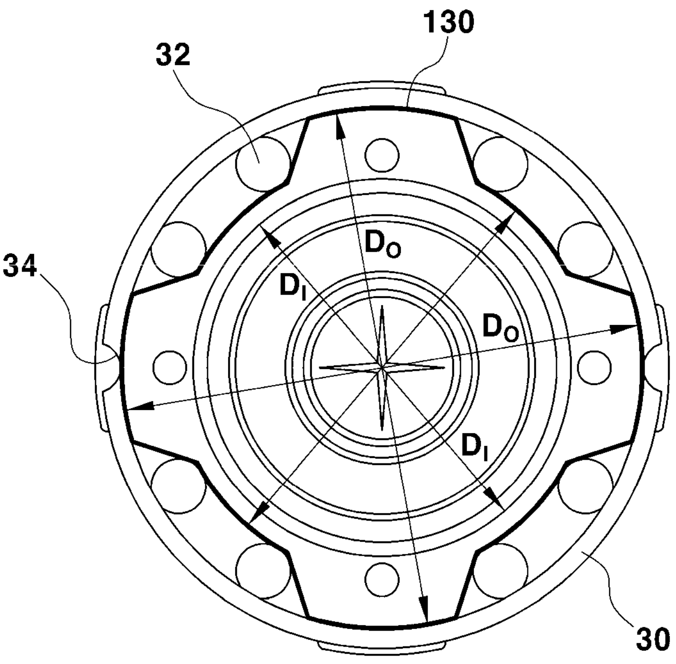
FIG. 7 is a partial cross-sectional view of a nozzle assembly according to various exemplary embodiments of the present disclosure.
FIG. 8 illustrates a portion of an upper nozzle second passage and is a view explaining the relationship between a membrane and an upper nozzle according to various exemplary embodiments of the present disclosure.

Referring to FIG. 8, relative movement between the membrane 30 and the lower nozzle 200 may be blocked by the membrane second coupling portion 34 of the membrane 30 and the membrane first coupling portion 250 of the lower nozzle 200. Accordingly, the fixing protrusion 32 may be fixed at a predetermined position thereof. Therefore, the fixing protrusion 32 is always located at the internal diameter portion $D_i$ side of the upper nozzle second passage 120 to thereby be fixed by the upper nozzle 100.

Besides, the upper nozzle second passage 120 in the upper nozzle 100 includes the external diameter portion $D_o$ and the internal diameter portion $D_i$. The external diameter portion $D_o$ is a portion of the upper nozzle second passage 120 including a larger diameter, and the internal diameter portion $D_i$ is a portion including a smaller diameter than the external diameter portion $D_o$. When the upper nozzle 100 overlaps the membrane 30, the external diameter portion $D_o$ extends to or extends very close to the circumference of the membrane 30, while the internal diameter portion $D_i$ extends only to a point inside the fixing protrusions 32 of the membrane 30. Therefore, according to an exemplary embodiment of the present disclosure, deterioration of the fixing function and durability of the membrane 30 may be prevented while maximally increasing the diameter of the upper nozzle second passage 120.

According to an exemplary embodiment of the present disclosure, the nozzle assembly 10 may be assembled as follows.

The membrane first coupling portion 250 of the lower nozzle 200 is aligned with the membrane second coupling portion 34 of the membrane 30. Then the membrane 30 is accommodated on the seating portion 240 of the lower nozzle 200. Thereafter, the upper nozzle second coupling portion 260 of the lower nozzle 200 is aligned with the upper nozzle first coupling portion 140 of the upper nozzle 100, and then the upper nozzle 100 is mounted to the lower nozzle 200. Because the position of the upper nozzle 100 relative to the lower nozzle 200 is regulated by the upper nozzle second coupling portion 260 and the upper nozzle first coupling portion 140, and rotation of the membrane 30 is restricted by the membrane first coupling portion 250 and the membrane second coupling portion 34, the fixing protrusion 32 may be fixed by the upper nozzle 100 at a predetermined position.

Figure 9:
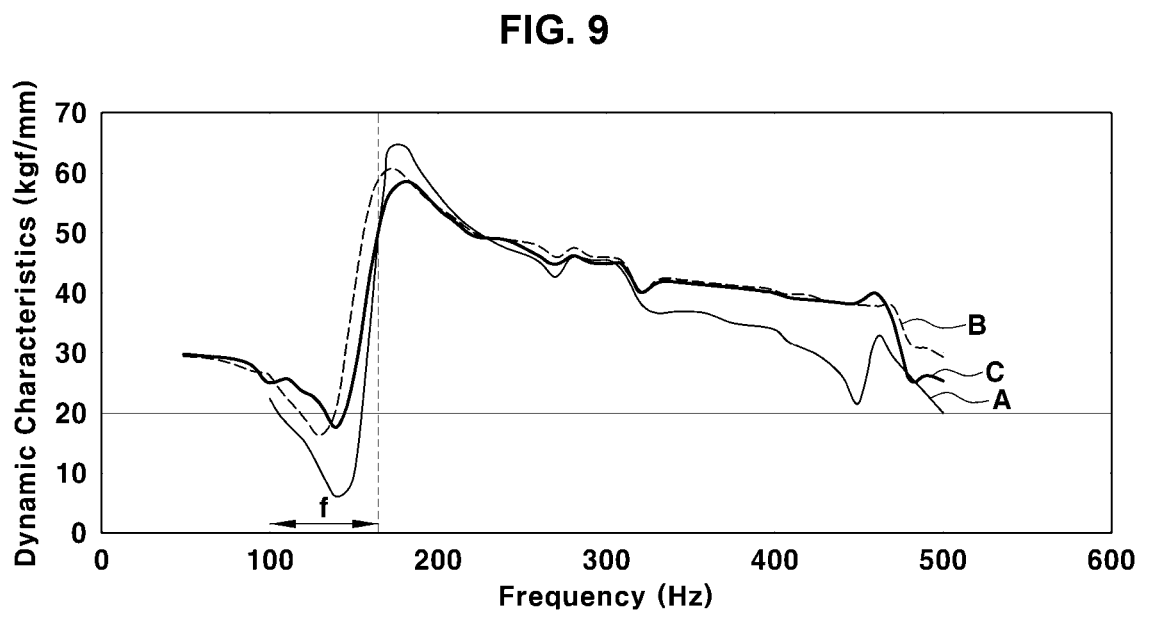

Referring to FIG. 9, the dynamic characteristics according to an exemplary embodiment of the present disclosure (graph A: a nozzle assembly including the internal diameter portion $D_i$ and the external diameter portion $D_o$ of the present disclosure) are lower than those of the comparative examples (graph B: a nozzle assembly including a diameter smaller than the internal diameter portion $D_i$ of the present disclosure, when there is only a circular upper nozzle second passage: graph C: a nozzle assembly including the same diameter as the internal diameter portion $D_i$ of the present disclosure, when there is only a circular upper nozzle second passage) in a corresponding frequency f band, and thus it is confirmed that the insulating performance of the present disclosure is advantageous.

Acceleration rattling noise may be improved by moving the dynamic characteristic dip frequency according to an exemplary embodiment of the present disclosure.

As is apparent from the above description, various aspects of the present disclosure are directed to providing the following effect.

According to an exemplary embodiment of the present disclosure, a hydraulic mount including a structure configured for improving insulation performance in a predetermined frequency band without significant design change is provided.

Effects of the present disclosure are not limited to the one described above, and other effects not mentioned herein will be clearly recognized by those skilled in the art based on the above description.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features of the exemplary embodiments with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hydraulic mount comprising:

a core;

an insulator molded on an external side of the core; and a diaphragm spaced at a predetermined distance from the insulator, wherein a fluid is sealed between the insulator and the diaphragm, and wherein an upper chamber and a lower chamber are provided between the insulator and the diaphragm by a nozzle assembly, and wherein the nozzle assembly includes:

an upper nozzle located adjacent to the upper chamber;

a lower nozzle coupled to the upper nozzle and located adjacent to the lower chamber; and a membrane located between the upper nozzle and the lower nozzle, wherein the nozzle assembly further includes a first passage of the upper nozzle and a second passage of the upper nozzle configured to fluidically-communicate the upper chamber with the lower chamber, respectively, wherein the second passage of the upper nozzle is defined by a guide wall protruding from a surface of the upper nozzle, the surface of the upper nozzle facing away from the lower nozzle, wherein the guide wall extends along a circumferential direction of the second passage of the upper nozzle, and wherein the guide wall includes a plurality of external diameter portions and a plurality of internal diameter portions having a diameter smaller than a diameter of the external diameter portions.

2. The hydraulic mount of claim 1, wherein the membrane is disposed inside the nozzle assembly to be in contact with the second passage of the upper nozzle.

3. The hydraulic mount of claim 1, wherein the plurality of external diameter portions and the plurality of internal diameter portions are alternately connected to form the second passage of the upper nozzle.

4. The hydraulic mount of claim 1, wherein the guide wall is disposed adjacent to a circumferential portion of the membrane so that a fluid pressure in the upper chamber acts on the membrane based on vibration in a frequency band being input.

5. The hydraulic mount of claim 1, wherein the membrane includes a plurality of fixing protrusions protruding from a surface of the membrane.

6. The hydraulic mount of claim 5, wherein the plurality of fixing protrusions are spaced from one another at predetermined intervals in a circumferential direction of the membrane.

7. The hydraulic mount of claim 6, wherein the internal diameter portions of the upper nozzle contacts with the fixing protrusions.

8. The hydraulic mount of claim 6, wherein the external diameter portions of the upper nozzle is not in contact with the fixing protrusions.

9. The hydraulic mount of claim 1, wherein the upper nozzle includes a plurality of radial members extending from the second passage of the upper nozzle in a radial direction of the upper nozzle, the plurality of radial members protruding from a surface of the upper nozzle.

10. The hydraulic mount of claim 1, wherein the membrane includes a portion around a second coupling portion, and the portion is disposed adjacent to external diameter portions of the upper nozzle.

11. The hydraulic mount of claim 1, wherein a plurality of fixing protrusions are disposed at an opposite side of a second coupling portion, and wherein the plurality of fixing protrusions protrude from a surface of the membrane and are spaced from each other with a predetermined distance.

12. The hydraulic mount of claim 11, wherein the fixing protrusions are overlapped by the upper nozzle at internal diameter portions of the upper nozzle.

13. The hydraulic mount of claim 1, wherein the upper nozzle includes a first coupling portion, and wherein the lower nozzle includes, to prevent movement between the upper nozzle and the lower nozzle, a second coupling portion, formed to correspond to the first coupling portion.

14. The hydraulic mount of claim 1, wherein the nozzle assembly further includes:

a first passage movement portion configured to fluidically-communicate with the first passage of the upper nozzle and formed inside the nozzle in a circumferential direction of the nozzle; and a first passage of the lower nozzle configured to allow the first passage movement portion to fluidically-communicate with the lower chamber.

15. The hydraulic mount of claim 14, wherein, based on a compressive force being applied to the hydraulic mount, the fluid flows from the first passage of the upper nozzle toward the first passage of the lower nozzle through the first passage movement portion.

16. The hydraulic mount of claim 14, wherein, based on a tensile force is being applied to the hydraulic mount, the fluid flows from the first passage of the lower nozzle toward the first passage of the upper nozzle through the first passage movement portion.

17. The hydraulic mount of claim 1, wherein the lower nozzle includes a seating portion on which the membrane is accommodated.

18. The hydraulic mount of claim 1, wherein the second passage of the lower nozzle which is partially blocked is provided radially inwardly from a seating portion.

* * * * *